364-422
PTU48 XR 4,100,483 SR

United States Patent [19]

Thompson et al.

[11] 4,100,483

[45] Jul. 11, 1978

[54] DIELECTRIC WELL LOGGING SYSTEM AND METHOD WITH ERROR CORRECTION

[75] Inventors: Larry W. Thompson; James R. Bridges, both of Houston; James A. Fuchs, Missouri City, all of Tex.

[73] Assignee: Texaco Inc., New York, N.Y.

[21] Appl. No.: 755,406

[22] Filed: Dec. 29, 1976

[51] Int. Cl.[2] .......................... G01V 3/18; G01V 3/10; G01R 25/00

[52] U.S. Cl. .......................................... 324/6; 324/85

[58] Field of Search ................ 324/6, 83 R, 83 D, 85

[56] References Cited

U.S. PATENT DOCUMENTS

| | | | |
|---|---|---|---|
| 3,553,579 | 1/1971 | Teixeira | 324/83 D |
| 3,562,646 | 2/1971 | Maxwell et al. | 324/85 |
| 3,849,721 | 11/1974 | Calvert | 324/6 |
| 3,891,916 | 6/1975 | Meador et al. | 324/6 |
| 3,982,176 | 9/1976 | Meador | 324/6 |

FOREIGN PATENT DOCUMENTS

| | | | |
|---|---|---|---|
| 212,387 | 10/1969 | U.S.S.R. | 324/6 |

*Primary Examiner*—Gerard R. Strecker

*Attorney, Agent, or Firm*—Thomas H. Whaley; Carl G. Ries; Ronald G. Gillespie

[57] ABSTRACT

A dielectric well logging system includes a logging tool adapted to be passed through a borehole traversing an earth formation. The logging tool includes a transmitter which induces electric energy into the earth formation at a radio frequency. Two receivers in the logging tool spaced a predetermined distance apart provides intermediate frequency signals corresponding to the electrical energy received from the earth formation. The intermediate frequency signals are transmitted by way of a cable to the surface. Surface electronics include zero crossing detectors, each detector receives a different intermediate frequency signal from the cable and provides a detector signal whose change in amplitude is representative of the intermediate frequency signal passing through zero. A source provides clock pulses at a frequency substantially greater than the frequency of the intermediate frequency signals. A logic circuit receiving the detector signals and the clock pulses provides groups of clock pulses in accordance with the detector signals. The number of clock pulses in each group corresponds to the dielectric constant of the earth formation.

20 Claims, 9 Drawing Figures

SURFACE ELECTRONICS
31
CABLE MEANS
30
LOGGING TOOL 1
$E_6$
$E_5$
A.G.C.
26
20
A.G.C.
24
19
SIGNAL SOURCE
17
$E_1$
$E_4$
$E_3$
MIXER
16
MIXER
14
TRANSMITTER
5
11
9
7

SURFACE ELECTRONICS 31
ZERO CROSSING DETECTOR
ZERO CROSSING DETECTOR
PHASE COMPARATOR
FILTER
VCO
÷ by N
COUNT DOWN COUNTER MEANS
PRESET MEANS
ONE SHOT
COUNTER MEANS
DISPLAY MEANS
RECORD MEANS
Q
V
E5
E6
E7
E9
E10
E11
33
34
38
40
42
43
45
47
50
53
54
57
60
63
64
65
70
71
73
75
80
83

DIELECTRIC WELL LOGGING SYSTEM AND METHOD WITH ERROR CORRECTION

BACKGROUND OF THE INVENTION

1. Field of the Invention

The present invention relates to well logging systems and methods in general and, more particularly, to dielectric well logging systems and methods.

2. Description of the Prior Art

In a previous system, the output from an AND gate was applied to an integrator downhole in the logging tool which integrated the voltage. However, due to the high temperature variations present in borehole well logging, considerable drift was experienced from that type of a measuring device. The present invention represents an improvement over the aforementioned device since its output is not adversely affected by temperature in the borehole. Further, better resolution of measurement can be obtained using the present invention. The present invention also corrects for known errors and has internal calibration circuitry.

SUMMARY OF THE INVENTION

A dielectric well logging system comprises a logging tool adapted to be passed through a borehole traversing an earth formation, an electric cable and surface electronics. The logging tool includes a transmitter which induces electrical energy into the earth formation at a radio frequency. The logging tool also includes two receiver circuits spaced a predetermined distance apart which provides intermediate frequency signals corresponding to electrical energy received from the earth formation. The intermediate frequency signals are conducted from the borehole to the surface by the electrical cable. The surface electronics include zero crossing detectors. Each detector receives a different intermediate frequency signal from the cable and provides a detector signal whose change in amplitude is representative of its received intermediate frequency signal passing through zero. A source provides clock pulses at a frequency substantially greater than the frequency of the intermediate frequency signals. A logic circuit receives the detector signals and clock pulses and provides groups of clock pulses in accordance with the detector signals. The number of clock pulses in each group corresponds to the dielectric constant of the earth formation.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE INVENTION

Figure 1:
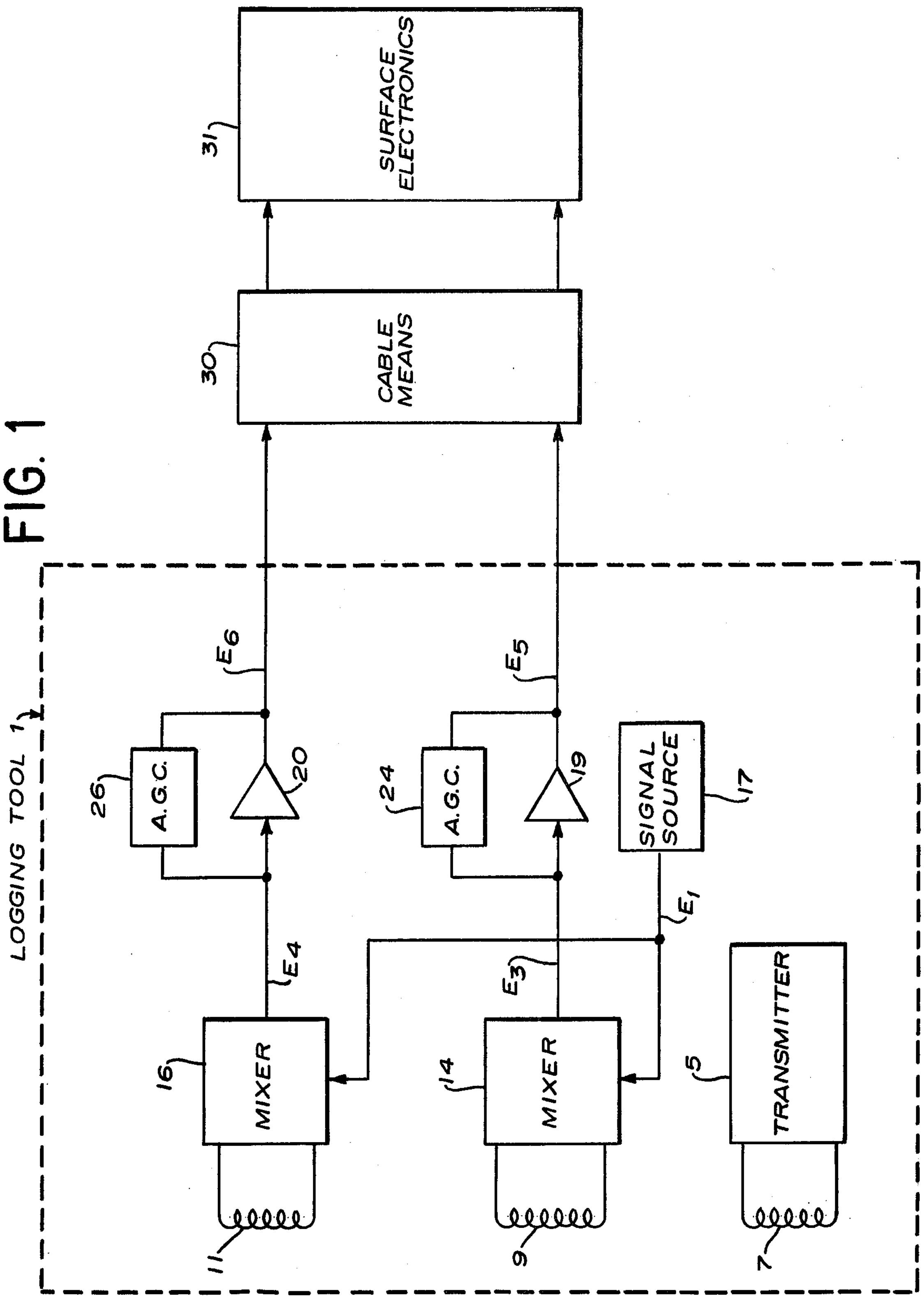
FIG. 1 is in part a simplified block diagram and in part a detailed block diagram of a well logging system constructed in accordance with the present invention.

Referring to FIG. 1, there is shown a dielectric well logging system including a logging tool 1 adapted to be passed through a borehole traversing an earth formation. Logging tool 1 includes a transmitter 5, which may be of a conventional type, providing a radio frequency signal to a coil 7 for inducing electrical energy into the earth formation at that frequency. Receiver coils 9 and 11, spaced a predetermined distance from each other, receives the induced electrical energy from the earth formation and provides corresponding signals to mixers 14 and 16, respectively.

Figure 2:
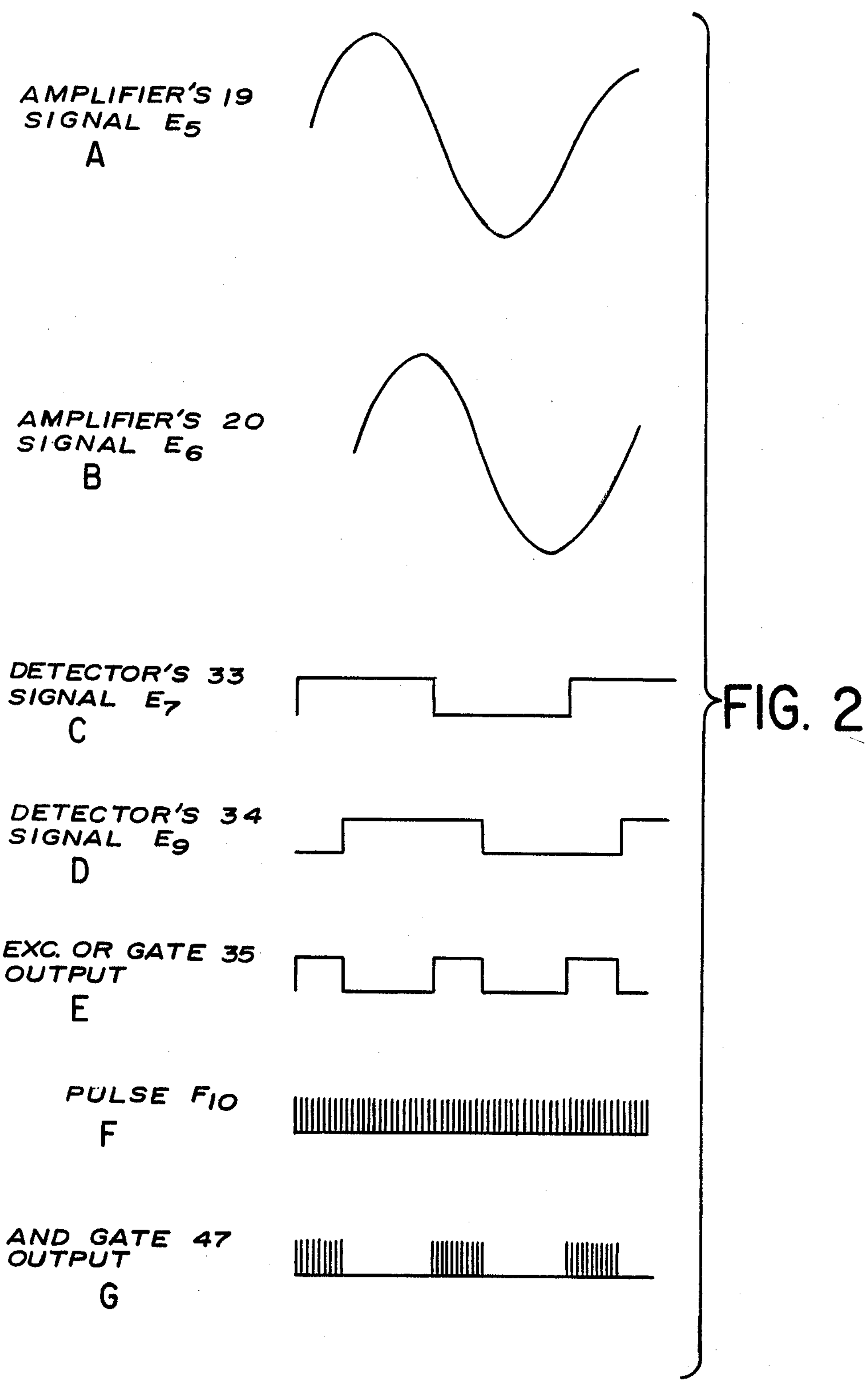
FIGS. 2A through 2G are graphical representations of voltage wave forms occurring during the operation of the system shown in FIG. 1.

Mixers 14, 16 receive a local frequency signal $E_1$ from a signal source 17 and provides intermediate frequency signals $E_3$ and $E_4$, respectively, to amplifiers 19 and 20. Amplifiers 19 and 20 provide signals $E_5$ (shown in FIG. 2A) and $E_6$ (shown in FIG. 2B), respectively. Feedback elements 24, 26 provide automatic gain control for amplifiers 19 and 20, respectively. Signals $E_5$, $E_6$ are transmitted up-hole by way of cable means 30 and applied to surface electronics 31.

Figure 3:
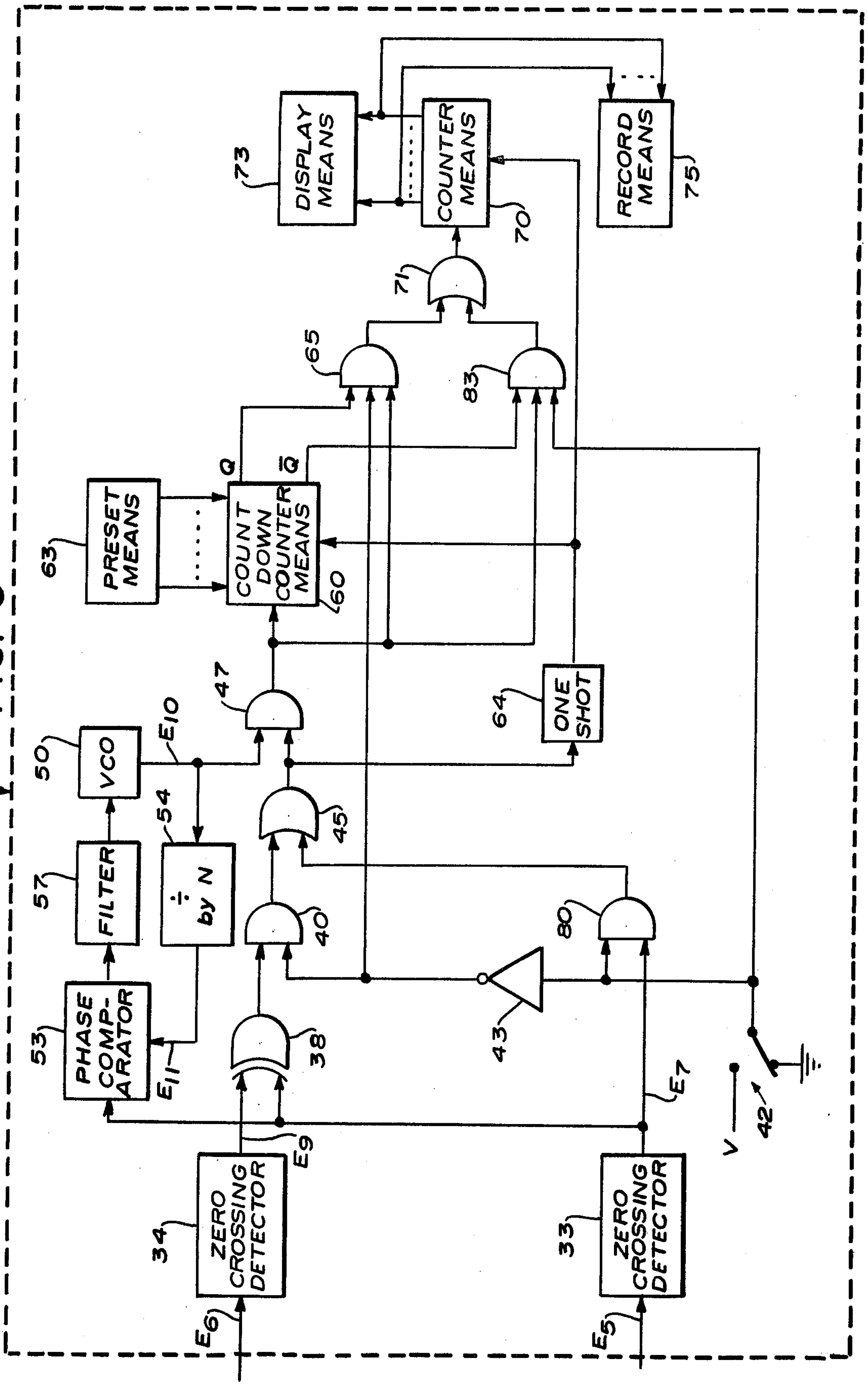
FIG. 3 is a detailed block diagram of the surface electronics shown in FIG. 1.

Referring now to FIG. 3, surface electronics 31 include zero crossing detectors 33, 34 receiving signals $E_5$ and $E_6$, respectively. Each zero crossing detector 33 or 34 provides a signal whose amplitude changes from one logic level to another logic level every time its corresponding signal $E_5$ or $E_6$ passes through zero. Detectors 33, 34 provide signals $E_7$ and $E_9$, respectively, shown in FIGS. 2C and 2D, respectively. Signals $E_7$, $E_9$ are applied to an exclusive OR gate 38 which provides a signal, shown in FIG. 2E, to an AND gate 40.

A manually operative single pole, double throw switch 42 will pass either a positive voltage V it receives or a substantially zero voltage represented by a ground connection. The output of switch 42 is applied to an inverter 43 where it is inverted and applied to AND gate 40. The operation of switch 42 is to select between a measurement mode of operation and a calibration mode of operation. The measurement mode will be discussed hereinafter.

With switch 42 activated so as to pass a zero potential, inverter 43 provides a high logic level voltage to enable AND gate 40 causing it to provide a high level output when exclusive OR gate 38 provides a high level output and a low level output when exclusive OR gate 38 provides a low level output.

The output from AND gate 40 is applied through an OR gate 45 to another AND gate 47 receiving clock pulses $E_{10}$ from a voltage controlled oscillator 50.

Clock pulses $E_{10}$ are generated as follows. Signal $E_7$ from zero crossing detector 33 is provided to a phase comparator 53 which receives pulses $E_{11}$ from a divide by N divider 54. Divider 54 provides one pulse $E_{11}$ for every N pulses $E_{10}$ divider 54 receives from oscillator 50. Phase comparator 53 provides a voltage output to a filter 57 which in turn provides a filtered voltage to oscillator 50. Oscillator 50 is controlled by the voltage to provide clock pulses $E_{10}$ at a frequency N times greater than the frequency of signal $E_7$.

When the output from OR gate 45 is at a high level and thus corresponding to the phase difference between signals $E_7$ and $E_9$, AND gate 47 passes pulses $E_{10}$ to countdown means 60. Countdown counter means 60 is able to provide for error correction inherent in the logging tool. The system may be tested at the surface in air to determine the error count. The error count is preset in counter 60 by way of preset means 63. Preset means 63 by way of example may be several thumbwheel switches providing digital signals to counter means 60. The output from OR gate 45 is also applied to a one shot multivibrator 64 which provides a negative going pulse whose leading edge resets counter means 60 while the trailing edge causes counter means 60 to load in the digital signals from preset means 63.

As AND gate 47 provides pulses to counter means 60, counter means 60 counts down until it reaches a zero count. At a zero count, the Q and Q outputs of counter means 60 are at a high and low logic level, respectively, while at a non-zero count, outputs Q and Q are at a low and high level, respectively. Thus when counting down the Q output is at a low level and disables an AND gate 65 so that the pulses provided to AND gate 65 by AND gate 47 are blocked by AND gate 65. AND gate 65 is also partially enabled by the high level output from inverter 43. When the zero count is reached, the Q output goes to a high level fully enabling AND gate 65 causing AND gate 65 to pass the pulses from AND gate 47. It should be noted at this time that a certain number of pulses, corresponding to the preset error count, has not been passed through AND gate 65 so that in effect the number of pulses corresponding to the error count has been removed from the number of pulses passing through AND gate 65 which now corresponds to the dielectric constant.

The pulses from AND gate 65 are applied to counter means 70 through an OR gate 71. Counter means 70 counts the pulses and provides an output corresponding to its count to display means 73 and to recording means 75. Recording means 75 may also be a recorder for recording the digital signals on magnetic tape for use with a computer at a later time. Counter means 70 is also reset by the pulse from one-shot multivibrator 64.

In the calibration mode of operation, switch 42 is activated to apply the positive voltage V to inverter 43 which in turn provides a low level output disabling AND gates 40, 65. The disabling of AND gate 40 prevents the phase difference between signals $E_5$ and $E_6$ from affecting the counting process.

Signal $E_7$ from detector 33 is applied to an AND gate 80 which is enabled by the high level signal from switch 42 to provide a high level output through OR gate 45 to AND gate 47. It should be noted that signal $E_7$ is at a high level for one-half of each cycle of signal $E_5$ and a low level for the other half, so that the high level output from AND gate 80 causes AND gate 47 to pass pulses $E_{10}$. The number of passed pulses $E_{10}$ corresponds to a half cycle of signal $E_5$. In the calibration mode of the operation, countdown counter means 60 is preset to a specific number desired for calibration purposes. The Q output of counter means 60 is applied to another AND gate 83 receiving passed pulses from AND gate 47 and is partially enabled by the high level signal from switch 42. Counter means 60 Q output enables AND gate 83 to pass pulses from AND gate 47 until a zero count is reached. When a zero count is reached, the Q output goes to a low level disabling AND gate 83 so that the number of pulses counted by counter means 70 corresponds to the number set in counter means 60 by preset means 63.

The dielectric well logging system as hereinbefore described provides for inducing electrical energy in the earth formation at an RF frequency and providing intermediate frequency signals in accordance with received electrical energy from the earth formation at different locations spaced a predetermined distance apart. The intermediate frequency signals are transmitted uphole to the surface electronics where the IF signals are processed to provide groups of pulses in a manner so that the number of pulses in each group corresponds to the dielectric constant of the earth's formation. The present invention further provides for the removal of a known error in the system and also for the calibration of the system.

What is claimed is:

1. A dielectric well logging system comprising a logging tool adapted to be passed through a borehole traversing an earth formation, said logging tool includes means for inducing electrical energy into the earth formation at a radio frequency, and at least two receiver means spaced a predetermined distance apart for providing intermediate frequency signals corresponding to electrical energy received from the formation; cable means connected to the receiver means for transmitting the intermediate frequency signals; and surface electronics including zero crossing detector means connected to the cable means, each detector means receiving a different intermediate frequency signal from the cable means for providing a detector signal whose change in amplitude is representative of the intermediate frequency signal passing through zero, clock pulse means for providing clock pulses at a frequency substantially greater than the frequency of the intermediate frequency signals, gating means connected to the detector means and to the clock pulse means for providing groups of clock pulses in accordance with the detector signals, the number of clock pulses in each group corresponding to the dielectric constant of the earth formation and to a known error, error means connected to the gating means for removing a number of pulses from each group of pulses corresponding to the known error, said error means includes first counter means connected to the gating means for counting the pulses in the groups of pulses and providing a first output signal of one amplitude when the count in the first counter means does not exceed the error count and of another amplitude when the count exceeds an error count, means connected to the first counter means for resetting the first counter means prior to each group of pulses, and switching means connected to the gating means and to the first counter means for blocking the pulses in each group of pulses when the first output signal is of the one amplitude and for passing the pulses in each group of pulses when the first output signal is of the other amplitude.

2. A system as described in claim 1 in which the signal from each detector means will be either at a high logic level or at a low logic level in accordance with its received intermediate frequency signal; and the gating means includes an exclusive OR gate connected to both detector means which provides a signal at a high logic level when one of the detectors provides a high logic level signal and at a low logic level when the signals from the detector are both at the same logic level, and an AND gate connected to clock pulse means, to the counter means, to the first switching means and to the exclusive OR gate for passing the clock pulses to the counter means and to the first switching means when the signal from the exclusive OR gate is at a high logic level and for blocking the clock pulses when the signal is at a low logic level so as to provide groups of pulses to the counter means and to the first switching means.

3. A system as described in claim 2 in which the reset means is a one shot multivibrator connected to the exclusive OR gate which provides a pulse in response to the signal from the exclusive OR gate changing to the high logic level; and the first counter means includes preset means for providing digital signals corresponding to the error count, and a count-down counter connected to the AND gate, to the preset means, to the one shot and to the first switching means which is reset by the pulses from the one shot, to load the digital signals from the preset means, which count down the pulses passed by the first AND gate and which provides the first output signal to the first switching means at the one amplitude when its count is not a zero count and at the other amplitude when its count is a zero count.

4. A system as described in claim 3 further comprising second counter means connected to the first switching means and to the one shot for being reset by the pulses from the one shot and for counting the pulses passed by the first switching means and for providing digital signals corresponding to the count in the second counter means, and means connected to the second counter means for recording the digital signals from the second counter means.

5. A system as described in claim 4 further comprising display means connected to the second counter means for providing a display corresponding to the dielectric constant of the earth formation in accordance with the digital signals from the second counter means.

6. A system as described in claim 5 in which the preset means is manually adjustable to provide signals corresponding either to the error count when the system is measuring the dielectric constant or to a predetermined calibration count when the system is being calibrated, and the count-down counter provides a second output signal whose amplitude is at a high logic level when the first output signal is at a low logic level and at a low logic level when the first output signal is at a high logic level; and further comprising second switching means which is manually operative and connected between the exclusive OR gate and the AND gate for passing the signal from the exclusive OR gate to the AND gate when the system is measuring the dielectric constant of the earth formation and for passing the signal from one of the detector means to the AND gate when the system is being calibrated, and third switching means receiving the second output signal from the count-down counter for passing the pulses provided by the first AND gate when the second output signal from the count-down counter is at a high logic level and the system is being calibrated and to block the pulses from the first AND gate when the second output signal is at a low level or when the system is measuring the dielectric content.

7. A dielectric well logging system comprising a logging tool adapted to be passed through a borehole traversing an earth formation, said logging tool includes means for inducing electrical energy into the earth formation at a radio frequency, and at least two receiver means spaced a predetermined distance apart for providing intermediate frequency signals corresponding to electrical energy received from the formation; cable means connected to the receiver means for transmitting the intermediate frequency signals; and surface electronics including zero crossing detector means connected to the cable means, each detector means receiving a different intermediate frequency signal from the cable means for providing a detector signal whose change in amplitude is representative of the intermediate frequency signal passing through zero, the signal from each detector means will be at a high logic level or a low logic level in accordance with its received intermediate frequency signal, clock pulse means for providing clock pulses at a frequency substantially greater than the frequency of the intermediate frequency signals, calibration means and gating means connected to the detector means and to the clock pulse means for providing groups of clock pulses in accordance with the detector signals, the number of clock pulses in each group corresponding to the dielectric constant of the earth formation said gating means includes an exclusive OR gate connected to both detector means which provides a signal at a high logic level when one of the detectors provides a high level signal and at a low logic level when the signals from the detector are both at the same logic level, and an AND gate connected to clock pulse means and to the exclusive OR gate for passing the clock pulses when the signal from the exclusive OR gate is at a high logic level and for blocking the clock pulses when the signal is at a low logic level so as to provide groups of pulses and the calibration means includes first switching means which is manually operative and connected between the exclusive OR gate and the AND gate for passing the signal from the exclusive OR gate to the AND gate when the system is measuring the dielectric constant of the earth formation and for passing the signal from one of the detector means to the AND gate when the system is being calibrated, so that during the measurement the number of pulses in each group of pulses provided by the AND gate corresponds to the dielectric constant and during calibration the number of pulses in each group of pulses correspond to a half-cycle of the intermediate frequency signal being provided to the detector means, first counter means connected to the AND gate for counting the pulses in the groups of pulses from the AND gate and providing a first output signal of one amplitude when the count in the first counter does not exceed a calibration count and of another amplitude when the count exceeds the calibration count, means connected to the first counter means for resetting the first counter means prior to each group of pulses, means for providing a calibration signal when calibrating the system, and second switching means connected to the calibration signal means and to the first counter means for passing the pulses in each group of pulses during the presence of a calibration signal and when the signal from the first counter means is of the one amplitude and for blocking the pulses in each group of pulses when the signal from the first counter means is of the other amplitude or during the absence of a calibration signal.

8. A system as described in claim 7 in which the reset means is a one shot multivibrator connected to the first switching means which provides a pulse in response to the signal from the first switching means changing to a high logic level; and the first counter means includes preset means for providing digital signals corresponding to the calibration count, and a count-down counter connected to the first AND gate, to the preset means, to the one shot and to the second switching means which is reset by the leading edge of the pulses from the one shot, which loads in the digital signals from the preset means in response to the trailing edge of the pulse from the one shot, which count down the pulses passed by the first AND gate and which provides the output signal to the second switching means at the one amplitude when its count is not a zero count and at the other amplitude when its count is a zero count.

9. A system as described in claim 8 further comprising second counter means connected to the second switching means and to the one shot for being reset by the pulses from the one shot and for counting the pulses passed by the second switching means and for providing digital signals corresponding to the count in the second counter means, and means connected to the second counter means for recording the digital signals from the second counter means.

10. A system as described in claim 9 further comprising display means connected to the second counter means for providing a display corresponding to the dielectric constant of the earth formation in accordance with the digital signals from the second counter means.

11. A dielectric well logging method which comprises the steps of inducing electrical energy into an earth formation, simultaneously receiving electrical energy from the earth formation at two different locations spaced a predetermined distance apart, providing intermediate frequency signals in the borehole corresponding to the electrical energy received from earth formation; transmitting the intermediate frequency signals to the surface; receiving the intermediate frequency signals at the surface; providing a detector signal from each received intermediate frequency signal whose change in amplitude is representative of the intermediate frequency signal passing through zero; providing clock pulses at a frequency substantially greater than the frequency of the intermediate frequency signals; and providing a first mentioned group of clock pulses in accordance with the detector signals, the number of clock pulses in each group corresponding to the dielectric constant of the earth formation and a known error, and removing a number of pulses from each group of pulses corresponding to the known error to provide second mentioned groups of pulses, said error removal step includes counting the pulses in the first mentioned groups of pulses, providing a first output signal of one amplitude when the count does not exceed the error count and of another amplitude when the count exceeds the error count, resetting the count prior to each group of pulses, not providing the pulses in each group of the first mentioned groups of pulses when the first output signal is of the one amplitude, and providing the pulses in each group of the first mentioned groups of pulses when the first output signal is of the other amplitude so as to provide the second mentioned groups of pulses.

12. A method as described in claim 11 in which each detector signal will be either at a high logic level or at a low logic level in accordance with its corresponding received intermediate frequency signal; and the step of providing the first mentioned groups of clock pulses includes providing a phase difference signal at a high logic level when one of the detector signals is at a high logic level and at a low logic level when the detector signals are both at the same logic level, and providing the clock pulses when the phase difference signal is at a high logic level and for blocking the clock pulses when the phase difference signal is at a low logic level so as to provide the first mentioned groups of pulses.

13. A method as described in claim 12 in which the resetting step includes providing a reset pulse in response to the phase difference signal changing to the high logic level; and the counting step includes providing digital signals corresponding to the error count, resetting the count to the error count in accordance with the digital signals and in response to the reset pulses, counting down the pulses in the first mentioned groups of pulses, and providing the first output signal at the one amplitude when the count is not a zero count and at the other amplitude when the count is a zero count.

14. A method as described in claim 13 further comprising the step of counting the pulses in the second groups of pulses, resetting the count to zero prior to counting the pulses in each group of the second mentioned group of pulses, providing signals corresponding to the last mentioned count, and recording the digital signals corresponding to the last mentioned count.

15. A method as described in claim 14 further comprising the step of providing a display corresponding to the dielectric constant of the earth formation in accordance with the digital signals corresponding to the last mentioned count.

16. A method as described in claim 15 in which the providing of error count digital signals is manually controlled to provide digital signals corresponding either to the error count when the dielectric constant is being measured or to a predetermined calibration count when calibration is performed; providing a second output signal whose amplitude is at a high logic level when the first output signal is at a low logic level and at a low logic level when the first output signal is at a high logic level; and further comprising steps of passing the phase difference signal when the dielectric constant of the earth formation is being measured and passing one of the detector signals when calibration is being performed, receiving the second output signal, passing the pulses of the first mentioned groups of pulses when the second output signal is at a high logic level and calibration is being performed, and blocking the pulses in the first mentioned groups of pulses when the second output signal is at a low level or when the earth formation dielectric constant is being measured so that number of pulses in each group of the second group of pulses correspond to the calibration count.

17. A dielectric well logging method which comprises the steps of inducing electrical energy into an earth formation, simultaneously receiving electrical energy from the earth formation at two different locations spaced a predetermined distance apart, providing intermediate frequency signals in the borehole corresponding to the electrical energy received from earth formation; transmitting the intermediate frequency signals to the surface; receiving the intermediate frequency signals at the surface; providing a detector signal for each received intermediate frequency signal whose change in amplitude is representative of the intermediate frequency signal passing through zero, each detector signal will be either at a high logic level or at a low logic level in accordance with its received corresponding intermediate frequency signal; providing clock pulses at a frequency substantially greater than the frequency of the intermediate frequency signals; providing first mentioned groups of clock pulses in accordance with the detector signals, the number of clock pulses in each group corresponding to the dielectric constant of the earth formation when the dielectric constant of the earth formation is being measured and to a half-cycle of an intermediate frequency signal when a calibrated output is to be provided, the step of providing the first mentioned groups of pulses includes providing a phase difference signal at a high logic level when one of the detector signals is at a high logic level signal and at a low logic level when the detector signals are both at the same logic level, passing the phase difference signal when a dielectric measurement is to be provided and blocking the phase difference signal when a calibrated output is to be provided, passing one of the detector signals when a calibrated output is to be provided and blocking the detector signal when the dielectric constant is being measured, passing the clock pulses when the passed phase difference signal or the passed detector signal is at a high logic level, and blocking the clock pulses when the passed phase difference signal is at a low logic level so as to provide the first mentioned groups of pulses, providing second mentioned groups of pulses when a calibrated output is to be provided, the number pulses in each second mentioned group of pulses corresponding to a calibration count, said step of providing second mentioned groups of pulses includes counting the pulses in each group of the first mentioned groups of pulses when the one detector signal is being passed, providing an output signal of one amplitude when the count in the first mentioned counting step does not exceed a calibration count and of another amplitude when the count in the first mentioned counting step exceeds the calibration count, resetting the count in the first mentioned counting step prior to each group of the first mentioned groups of pulses, providing a calibration signal when a calibrated output is to be provided, passing the pulses in each group of the first mentioned groups of pulses during the presence of a calibration signal and when the output signal is of the one amplitude, and blocking the pulses in each group of the first mentioned groups of pulses when the output signal is of the other amplitude or during the absence of a calibration signal so as to provide second groups of pulses, the number of pulses in each group of the second group of pulses correspond to the calibration count.

18. A method as described in claim 17 in which the resetting step includes providing a pulse in response to the phase difference signal changing to a high logic level; and the first counting step includes providing digital signals corresponding to the calibration count, and resetting the count to the calibration count in accordance with the digital signals and in response to the reset pulses, counting down the pulses in the first mentioned groups of pulses and providing the output signal at the one amplitude when the count is not a zero count and at the other amplitude when its count is a zero count.

19. A method as described in claim 18 further comprising the step of a second counting of the pulses in each group of the second groups of pulses, resetting the second count to zero prior to each group of the second groups of pulses, and providing digital signals as the calibrated output corresponding to the second count, and recording the second count digital signals.

20. A method as described in claim 19 further comprising the step of providing a display corresponding to the calibration count when the calibration output is being provided and to the dielectric constant of the earth formation when the dielectric constant is being measured.

* * * * *